(12) United States Patent
Zeng

(10) Patent No.: US 12,369,236 B2
(45) Date of Patent: Jul. 22, 2025

(54) COLOR CORRECTION DETECTION APPARATUS AND COLOR CORRECTION SYSTEM HAVING EXTERNAL FLASH

(71) Applicant: YINGYOU EQUIPMENT CO., LTD., Guangdong (CN)

(72) Inventor: Weiling Zeng, Guangdong (CN)

(73) Assignee: YINGYOU EQUIPMENT CO., LTD., Guangdong (CN)

( * ) Notice: Subject to any disclaimer, the term of this patent is extended or adjusted under 35 U.S.C. 154(b) by 101 days.

(21) Appl. No.: 18/259,325

(22) PCT Filed: Jun. 22, 2021

(86) PCT No.: PCT/CN2021/101589
§ 371 (c)(1),
(2) Date: Jun. 26, 2023

(87) PCT Pub. No.: WO2022/156141
PCT Pub. Date: Jul. 28, 2022

(65) Prior Publication Data
US 2024/0064882 A1    Feb. 22, 2024

(30) Foreign Application Priority Data

Jan. 22, 2021 (CN) .......................... 202110090649.7
Jan. 22, 2021 (CN) .......................... 202120192649.3

(51) Int. Cl.
*H05B 45/20* (2020.01)
*G03B 15/05* (2021.01)

(52) U.S. Cl.
CPC ............. *H05B 45/20* (2020.01); *G03B 15/05* (2013.01)

(58) Field of Classification Search
None
See application file for complete search history.

(56) References Cited

U.S. PATENT DOCUMENTS

| 4,087,233 | A  |   | 5/1978 | Shaffer |
| 8,737,731 | B2 | * | 5/2014 | Park ...................... H05B 45/22 |
|           |    |   |        | 382/167 |

(Continued)

FOREIGN PATENT DOCUMENTS

| CN | 1446444 | 10/2003 |
| CN | 1912770 | 2/2007 |

(Continued)

OTHER PUBLICATIONS

WIPO, International Search Report for PCT/CN2021/101589, Sep. 28, 2021.

(Continued)

*Primary Examiner* — Kenneth B Wells
(74) *Attorney, Agent, or Firm* — Hodgson Russ LLP

(57) ABSTRACT

A color correction processing apparatus comprises a first communication circuit, a color correction processing circuit and a second communication circuit, wherein the first communication circuit is used for receiving digital quantity data of light-emission information of an external flash; the color correction processing circuit is electrically connected to the first communication circuit, so as to receive the digital quantity data of the light-emission information by means of the first communication circuit, and carries out color correction processing according to the digital quantity data of the light-emission information to generate color correction result information; and the second communication circuit is used for electrically connecting to the external flash, and the second communication circuit transmits the color correction result information to the external flash, so as to correct light emission of the external flash.

19 Claims, 4 Drawing Sheets

(56) References Cited

U.S. PATENT DOCUMENTS

| | | | |
|---|---|---|---|
| 9,071,744 B1 | 6/2015 | Rahman et al. | |
| 9,326,348 B2* | 4/2016 | Roshan | H05B 45/22 |
| 2004/0075762 A1 | 4/2004 | Okubo | |
| 2005/0281549 A1 | 12/2005 | Shih et al. | |
| 2009/0231354 A1* | 9/2009 | Blaut | H05B 45/22 |
| | | | 345/589 |
| 2010/0182294 A1 | 7/2010 | Roshan et al. | |
| 2012/0069240 A1* | 3/2012 | Osawa | G03B 19/12 |
| | | | 348/E5.029 |
| 2012/0154627 A1 | 6/2012 | Rivard et al. | |
| 2014/0035472 A1* | 2/2014 | Raj | H05B 45/22 |
| | | | 315/297 |
| 2015/0102728 A1 | 4/2015 | Kim | |
| 2017/0343887 A1* | 11/2017 | Hoshino | H04N 23/74 |
| 2019/0116301 A1* | 4/2019 | Pincenti | G03B 7/093 |
| 2021/0298143 A1* | 9/2021 | Zarcone | H05B 47/11 |

FOREIGN PATENT DOCUMENTS

| | | |
|---|---|---|
| CN | 102564592 | 7/2012 |
| CN | 102833485 | 12/2012 |
| CN | 106482060 | 3/2017 |
| CN | 110806673 | 2/2020 |
| CN | 112731733 | 4/2021 |
| CN | 112859488 | 5/2021 |
| CN | 214704263 | 11/2021 |
| DE | 19842367 | 7/2004 |
| DE | 102009012040 | 9/2010 |
| EP | 1628494 | 2/2006 |
| JP | H1174090 | 3/1999 |
| JP | 2005025005 | 1/2005 |
| JP | 2009042773 | 2/2009 |
| KR | 102072797 | 2/2020 |
| WO | 2016161486 | 10/2016 |

OTHER PUBLICATIONS

EPO, Extended European Search Report for EP Application No. 21920522.6, Jun. 24, 2024.

CNIPA, First Office Action for CN Application No. 202110090649.7, Dec. 31, 2024.

CNIPA, Second Office Action for CN Application No. 202110090649.7, May 31, 2025.

* cited by examiner

COLOR CORRECTION DETECTION APPARATUS AND COLOR CORRECTION SYSTEM HAVING EXTERNAL FLASH

CROSS-REFERENCE TO RELATED APPLICATIONS

This application is a national stage entry under 35 U.S.C. § 371 of International Application No. PCT/CN2021/101589, filed Jun. 22, 2021, which claims priority to Chinese Patent Application Nos. 202110090649.7 and 202120192649.3, each filed Jan. 22, 2021. The entire disclosures of the above-identified applications are incorporated herein by reference.

FIELD OF TECHNOLOGY

The present application relates to the technical field of photographing-specific flash, and more particularly, to a color correction detection apparatus, and a color correction system having the external flash.

BACKGROUND

With the development of mobile communication technology, mobile terminals play an increasingly important role in people's life and work. Especially there are some mobile terminal devices with photographing functions, such as mobile phone, MP4, PDA, and notebook computer. The camera functions inherent in these mobile terminal devices can bring great fun to people's lives. Photographing requires light sources, and artificial light is often needed to assist in photographing besides natural light. An artificial light source of the mobile terminal with photographing functions often cannot meet the actual use requirements. Therefore, people often use an external flash to assist in photographing.

However, after long-term use of LED lamp beads in the external flash, there will be deviations in chroma and light-emission intensity, resulting in the fact that actual light-emission brightness, chroma, and other light-emission parameters cannot reach preset light-emission parameters so that the expected light filling effect cannot be realized.

The above information disclosed in the Background is only for the enhancement of understanding of the background of the present application and therefore it may include information that does not constitute prior art known to a person of ordinary skill in the art.

SUMMARY

There are provided a color correction processing apparatus and a color correction system having the external flash according to embodiments of the present disclosure. The technical solution is as below:

According to one aspect of the present application, a color correction processing apparatus is provided in the present application, including:
- a first communication circuit configured to receive digital quantity data of light-emission information of an external flash;
- a color correction processing circuit electrically connected to the first communication circuit, so as to receive the digital quantity data of the light-emission information by means of the first communication circuit, and to carry out color correction processing according to the digital quantity data of the light-emission information to generate color correction result information; and
- a second communication circuit configured to be electrically connected to the external flash, the second communication circuit being electrically connected to the color correction processing circuit to transmit the color correction result information to the external flash, so as to correct light emission of the external flash.

According to another aspect of the present application, a color correction system having an external flash includes an external flash, a color correction detection device, a terminal device, and the color correction processing apparatus;
where the color correction detection device is configured to detect the light-emission information of the external flash and send the light-emission information to the terminal device; and the terminal device processes the light-emission information to obtain digital quantity data of light-emission information and sends the digital quantity data of the light-emission information to the color correction processing apparatus; and the color correction processing apparatus generates color correction result information according to the digital quantity data of the light-emission information and sends the color correction result information to the external flash, and the external flash corrects light emission according to the color correction result information.

BRIEF DESCRIPTION OF THE DRAWINGS

The above and other objects, features, and advantages of the present application will become more apparent by describing in detail exemplary embodiments thereof with reference to the drawings.

DETAILED DESCRIPTION OF THE EMBODIMENTS

Figure 1:
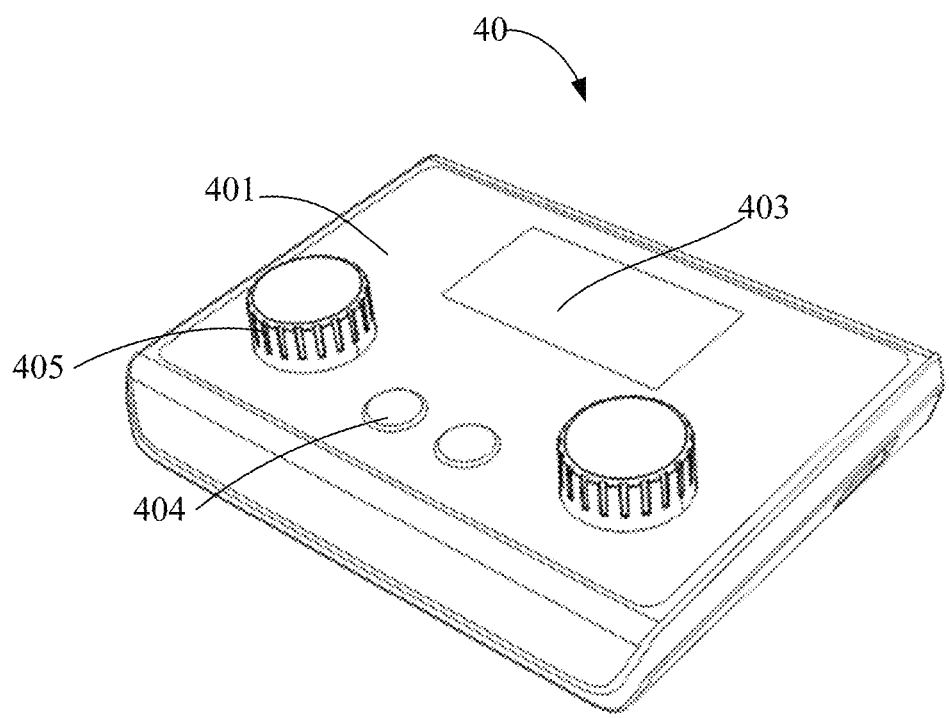
FIG. 1 shows a structural diagram of a color correction processing apparatus according to an example embodiment.

Although the present application can readily be embodied in different forms of embodiment, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front, and rear) are used to explain that the structure and movement of the various elements of the present application are not absolute but relative. These descriptions are appropriate when these elements are in the positions shown in the drawings. If the description of the positions of these elements changes, the indications of these directions will also be changed accordingly.

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art. The drawings are only schematic illustrations of the present application and are not necessarily drawn to scale. Like reference numerals in the drawing denote identical or similar parts and thus repetitive descriptions thereof will be omitted.

The preferred embodiment of the present application is further elaborated below in conjunction with the drawings of the description.

A color correction processing apparatus is first proposed in the present application, which is used for carrying out color correction for the external flash. Color correction may refer to matching the actual light-emission parameters of the external flash with the set light-emission parameters, and color correction may also refer to adjusting the consistency of light-emission parameters of each LED lamp bead in the external flash.

Referring to FIG. 1, in one embodiment, a color correction processing apparatus 40 includes a housing 401. Specifically, the housing 401 is roughly square, and an accommodating chamber is provided inside the housing 401 to accommodate one or more circuit boards. It should be understood that relevant circuits of the present application may be partially or completely laid on the circuit board. A side surface of the housing 401 may be provided with a switch key, and when the switch key is on, the color correction processing apparatus 40 is turned on, and when the switch key is off, the color correction processing apparatus 40 is turned off. The color correction processing apparatus 40 in the present application may be a handheld device, so as to facilitate a user to carry outdoors to carry out color correction on the external flash 10 at any time. The color correction processing apparatus 40 may be provided with a battery or a charging interface, so that the color correction processing apparatus 40 can be used without an external power supply.

Figure 2:
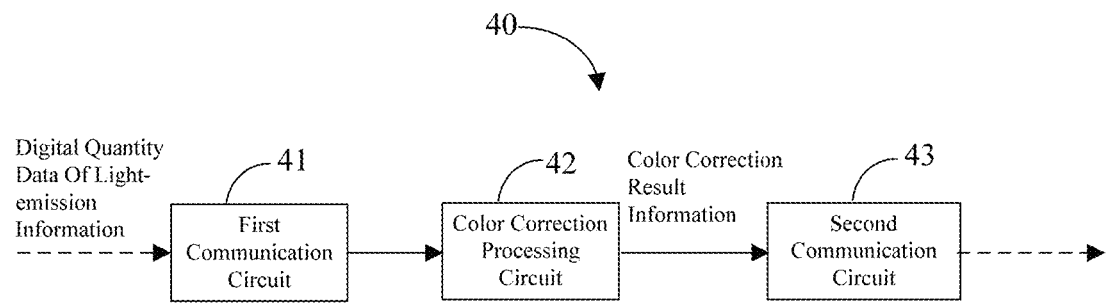
FIG. 2 shows a circuit block diagram of a color correction processing apparatus according to an example embodiment.
Figure 3:
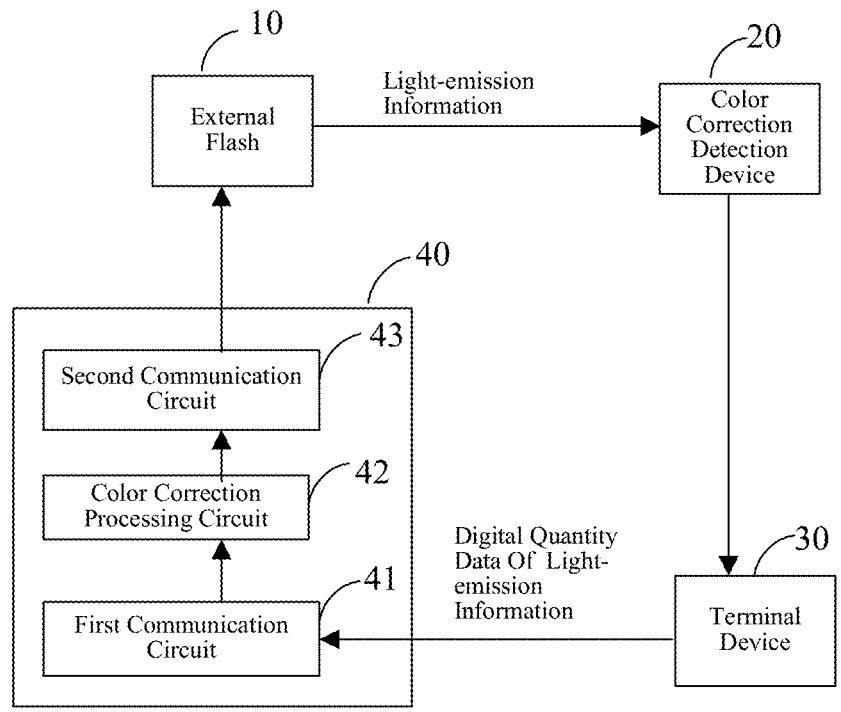
FIG. 3 shows a circuit block diagram of a color correction system having an external flash according to an example embodiment.

Referring to FIG. 2 and FIG. 3, in an embodiment, the color correction processing apparatus 40 includes a first communication circuit 41, a color correction processing circuit 42, and a second communication circuit 43. The first communication circuit 41 is used for receiving digital quantity data of light-emission information of the external flash 10. The color correction processing circuit 42 is electrically connected to the first communication circuit 41 to receive the digital quantity data of the light-emission information through the first communication circuit 41 and carries out color correction processing according to the digital quantity data of the light-emission information, to generate color correction result information. The second communication circuit 43 is used for being connected to the external flash 10, and the second communication circuit 43 transmits the color correction result information to the external flash 10, so as to correct light emission of the external flash 10.

It can be known from this embodiment that the color correction processing apparatus of the present application may be used for color correction of the external flash 10. Moreover, since the color correction processing circuit 42 receives the digital data of the light-emission information through the first communication circuit 41, the relevant circuits for performing preliminary data processing on the light-emission information, such as mode conversion, filtering, etc., are reduced, which is conductive to reducing the volume of the color correction processing apparatus 40, realizing miniaturization, and facilitating the user to carry out.

Figure 4:
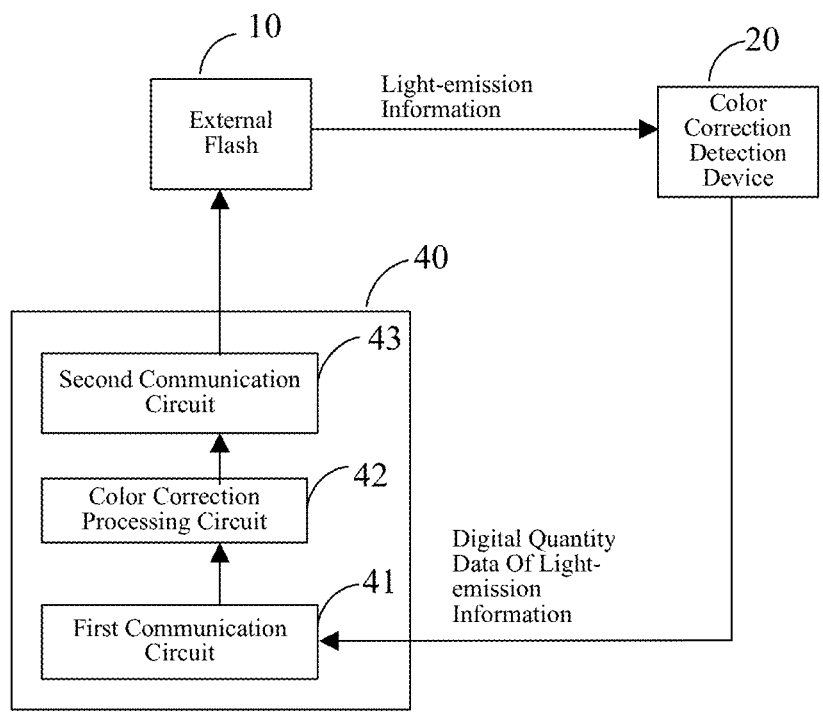
FIG. 4 shows a circuit block diagram of a color correction system for an external flash according to another example embodiment.

In an example, referring to FIG. 4, the first communication circuit 41 is electrically connected to a color correction detection device 20, so as to obtain the digital quantity data of the light-emission information from the color correction detection device 20. Specifically, the light-emission information of the above-mentioned light source circuit is collected by the color correction detection device 20. Here, the light-emission information includes one or more pieces of information on brightness, chroma, saturation, etc. Here, the external flash 10 may be taken as a whole to acquire its parameters such as brightness, chroma, saturation, etc. In another embodiment, in the case that a flash includes multiple LED light sources, the light-emission information is one or more parameters of brightness, chroma, saturation, and the like of each LED light source. That is, in this embodiment, each LED light source is used as a minimum circuit to carry out light-emission correction on each LED in a targeted manner, so as to improve the accuracy of light-emission correction. During the detection, each LED light source may be enabled to emit light independently, thereby obtaining the light-emission information of the LED light source.

The color correction detection device 20 may include a color pick-up circuit, a data conversion circuit, a filter circuit, etc. According to a target to be corrected, the color pick-up circuit may include various types of light sensors, such as brightness sensor, chroma sensor, and color temperature sensor. The color correction detection device 20 generally includes a collection window, and the collection window is exposed on the surface of the color correction detection device 20. The collection window is provided facing the light-emission surface of the external flash 10, thus the color pick-up circuit can receive the light emitted by the external flash 10. Here, the light emitted by the external flash 10 may be picked up multiple times. Schematically, the external flash 10 is enabled to operate in various light-emission modes and the light-emission information in each mode is sampled. Here, the light-emission modes include flashing mode, modeling light mode, constant lighting mode, etc. In each mode, the light-emission information is picked up at least once. The data conversion circuit is used for converting the analog quantity of the sampled light-emission information into the corresponding digital quantity data. The filter circuit is used for filtering an input or an output of the data conversion circuit to reduce noise interference.

The color correction detection device 20 may include a data sorting circuit. The data sorting circuit is connected to an analog-to-digital conversion circuit, so as to carry out data sorting on the collected digital quantity data of the light-emission information. The specific data sorting method may be determined according to a color correction algorithm, and the collected digital quantity data of the light-emission information may also be sorted one by one according to the position of the LEDs in the external flash 10. In fact, the data sorting circuit may also be provided in the terminal device 30 which is electrically connected to the color correction detection device 20.

Referring to FIG. 3, in another embodiment, the first communication circuit 41 is electrically connected to the terminal device 30, so as to obtain the digital quantity data of the light-emission information from the terminal device 30. Specifically, the color correction detection device 20 is electrically connected to the terminal device 30 to obtain the digital quantity data of the light-emission information, and then the terminal device 30 forwards the digital quantity data to the color correction processing apparatus 40. Alternatively, the above data sorting circuit is provided in the terminal device 30, and the data sorting is carried out by the terminal device 30.

In this embodiment, an electronic device carries out a sorting process on the collected light-emission information, and since the data sorting requires fast operation speed and storage capacity, the data sorting speed may be improved by using a powerful processor and large storage capacity of the electronic device. Since there is no need to provide a sorting circuit in the color correction detection device 20, the volume of the color correction detection device 20 can be reduced, which is conducive to improving the portability of the color correction detection device 20. Similarly, since there is no need to provide a sorting circuit in the color correction processing apparatus 40, the volume of the color correction processing apparatus 40 can be reduced, which is conducive to improving the portability of the color correction processing apparatus 40.

In addition, the above data conversion circuit may also be provided in the terminal device 30, and the data conversion circuit is connected between the data sorting circuit and the color correction detection device 20 to transmit the light-emission information sent by the color correction detection device 20 to the data sorting circuit after data conversion.

The terminal device 30 may be a smart terminal device 30, such as a mobile phone, tablet, or notebook computer; and the terminal device 30 may also be a smart wearable device, such as smart head-mounted device, smart bracelet, or smart belt.

The color correction processing apparatus 40 includes a data processing circuit, and a color correction processing algorithm may be stored in the data processing circuit, and the above sorted light-emission data is logically calculated with the color correction processing algorithm, thus generating color correction result information. The color correction result information may be an adjustment program or a specific light-emission correction value.

Schematically, in an example, the data processing circuit includes a color correction chip, and the color correction chip is internally provided with a correction coefficient matrix. Based on the correction coefficient matrix, the above sort sampled data is calculated and processed.

In another case, a preset parameter value is compared with the sampled light-emission information sorting data to correct a driving current of the external flash 10. The external flash driven by the corrected driving current can enable the actual light-emission parameters of the external flash 10 to exactly match the set parameters.

The first communication circuit 41 mentioned in the above embodiment, specifically, includes a wireless communication circuit, so as to receive the digital quantity data of the light-emission information from the terminal device 30 or the color correction detection device 20 through wireless transmission. The wireless communication circuit may be built into the color correction processing apparatus 40 or external to the color correction processing apparatus 40, for example, an external USB wireless transceiver. The wireless communication circuit includes one or more of a WIFI module, a Bluetooth module, a Zig-Bee module, and an infrared communication module. This embodiment improves the convenience of communication between the color correction processing apparatus 40 and the terminal device 30 or between the color correction processing apparatus 40 and the color correction detection device 20.

In another embodiment, the first communication circuit 41 includes a first communication interface, and the first communication interface is electrically connected to the color correction processing circuit 42 and provides electrical connection to the color correction detection device 20 or the terminal device 30. The first communication interface is one of a USB interface, a TYPE C interface, an RS232 interface, and an RS485 interface. Here, there may be one or more first communication interfaces.

In the above embodiment, the color correction processing apparatus 40 communicates with the external flash 10 through the second communication circuit 43. The second communication circuit 43 is electrically connected to the color correction processing circuit 42, so as to transmit the color correction result information to the external flash 10 to correct the light emission of the external flash 10.

Here, the second communication circuit 43 may include a wireless communication circuit to transmit the color correction result information through wireless transmission. The wireless communication circuit includes one or more of a WIFI module, a Bluetooth module, a Zig-Bee module, and an infrared communication module. This embodiment improves the convenience of communication between the color correction detection device 20 and the external flash 10.

In addition, the second communication circuit 43 may include a second communication interface, and the second communication interface is electrically connected to the color correction processing circuit 42 and provides electrical connection to the external flash 10. The second communication interface is one of a USB interface, a TYPE C interface, an RS232 interface, and an RS485 interface.

Figure 7:
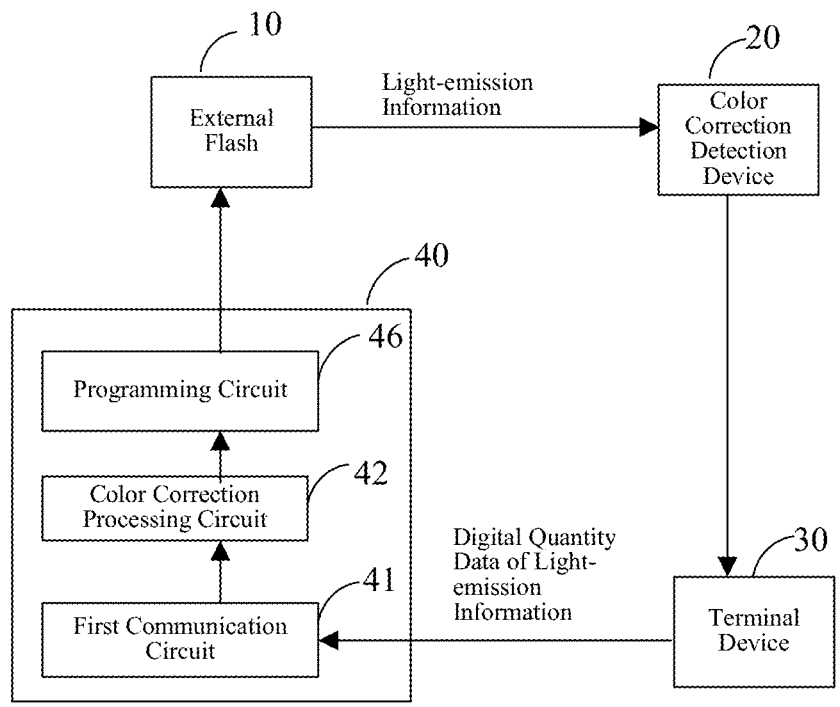
FIG. 7 shows a circuit block diagram of a color correction system having an external flash according to another example embodiment.

Referring to FIG. 7, in an embodiment, the color correction processing apparatus 40 further includes a programming circuit 46, and the programming circuit 46 is electrically connected to the color correction processing circuit 42, so as to program the color correction result information output by the color correction processing circuit 42 on a control chip of the external flash 10.

The programming circuit 46 may be in handshake communication with the external flash 10 and satisfy the relevant communication protocol, so as to smoothly program the program, adjust the light-emission control program of the original control chip, and adjust the driving current of the light source circuit of the external flash 10, thus fundamentally correcting the deviation of the light-emission effect of the external flash 10.

Here, the programming circuit 46 and the color correction processing circuit 42 may be directly or indirectly electrically connected, that is, the programming circuit 46 is electrically connected to the color correction processing circuit 42 through the communication circuit. The programming circuit 46 may be built into the housing 401 of the color correction processing apparatus 40; or the programming circuit 46 may be external to the housing 401 of the color correction processing apparatus 40 to form a physical module separately.

Figure 5:
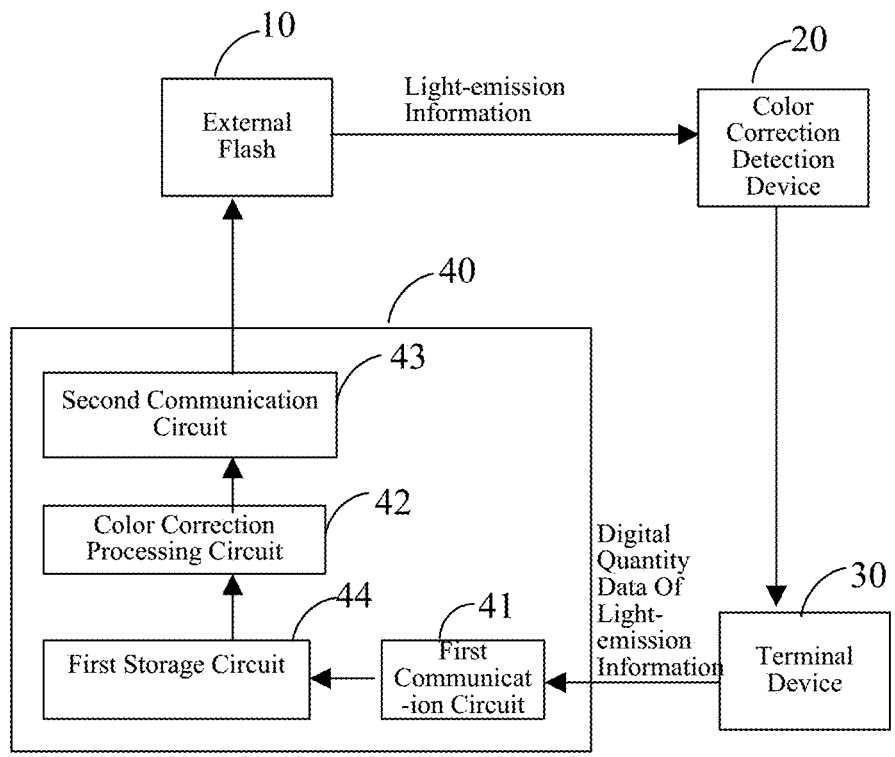
FIG. 5 shows a circuit block diagram of a color correction system having an external flash according to another example embodiment.

Referring to FIG. 5, in an embodiment, the color correction processing apparatus 40 further includes a first storage circuit 44, and the first storage circuit 44 is electrically connected to the first communication circuit 41, so as to store the digital quantity data of the light-emission information of the external flash 10 sent by the terminal device 30 or the color correction detection device 20.

By providing the first storage circuit 44, the color correction processing apparatus 40 can receive the digital quantity data of multiple sets of light-emission information at one time, thereby expanding the quantity of sampling data, and thus improving the accuracy of color correction.

Figure 6:
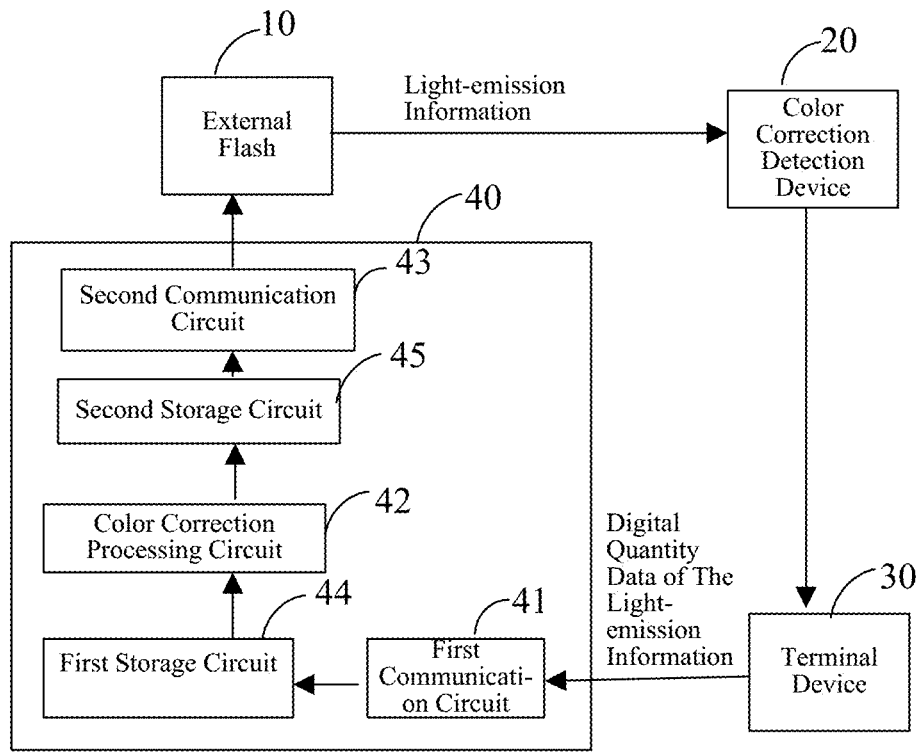
FIG. 6 shows a circuit block diagram of a color correction system having an external flash according to another example embodiment.

Referring to FIG. 6, in another embodiment, the color correction processing apparatus further includes a second storage circuit 45, and the first storage circuit 44 is electrically connected to the color correction processing circuit 42, so as to store the color correction result information. In this embodiment, after the color correction processing circuit 42 has generated the color correction result information, it does not need to be sent to the external flash 10 immediately, but can be sent to the external flash 10 at an appropriate time according to the needs of the user to achieve the final light-emission correction.

Here, the first storage circuit 44 and the second storage circuit 45 may include ROM, RAM, etc., or may be a storage medium, such as USB flash disk.

In an embodiment, the color correction processing apparatus 40 further includes a charging circuit, and an input of the charging circuit is connected to power, and an output of the charging circuit is electrically connected to the external flash 10. Specifically, the charging circuit may include a voltage conversion circuit, a current sampling circuit, etc. The arrangement of the charging circuit enables the color correction processing apparatus 40 to be used as an adapter, improving the versatility of the color correction processing apparatus 40, and thus providing the user with diversified services.

In an embodiment, the color correction processing apparatus 40 further includes a human-computer interaction assembly, and the human-computer interaction assembly is provided on the main body. The human-computer interaction assembly is used for one or more of receiving a color correction instruction, receiving a color correction setting parameter, and switching color correction modes. The human-computer interaction assembly communicates with the color correction detection device through the first communication circuit 41 and the external flash through the second communication circuit 43, so as to send the received instruction to the color correction detection device 20 and the external flash 10.

In an example, the human-computer interaction assembly may be a touch-control screen assembly, a key assembly, a voice input assembly, and the like for the user to input color correction relevant instructions. When the user sends a color correction instruction, the color correction detection device 20 starts to collect light-emission information, and then the color correction processing circuit 42 further starts to process data. The received color correction setting parameters include a color correction accuracy parameter, a color correction target parameter, etc. The color correction mode may include a brightness correction mode, a chroma correction mode, a saturation correction mode, and a comprehensive correction mode (simultaneously correcting brightness, chroma, saturation, etc.). In a specific embodiment, the human-computer interaction assembly includes a plurality of keys 404 and a knob 405. The user presses the keys 404 and turns the knob 405 to send a color correction instruction, set a color correction parameter, and switch color correction modes.

In an embodiment, the color correction processing apparatus 40 further includes a display screen 403, and the display screen 403 is provided on the housing 401; and the display screen 403 is electrically connected to the color correction processing circuit 42, so as to display a color correction control interface under the control of the color correction processing circuit 42. Here, a color correction application software may be stored in the color correction processing apparatus 40 (specifically, may be in the color correction processing circuit 42), and when the color correction application software is running, a color correction control interface can be displayed on the display screen 403. The color correction control interface includes multiple controls for the user to send a color correction control instruction, set a color correction parameter, select a color correction mode, etc. The color correction control interface may further include a display window to display the color correction progress. This embodiment improves the intelligence of the color correction processing apparatus 40, improves the human-computer interaction ability, and makes it convenient for the user to correct the different parameters of the external flash 10 according to their own needs, and correct these parameters to target parameters that meet their own requirements.

The above light-emission information and color correction result information only represent the substantial meaning of the signal. In fact, in the process of signal transmission, the form will change. For example, the conversion of the analog quantity and the digital quantity, transmission in the form of a single signal or packaging into data packets, etc., are not specifically limited herein.

Referring to FIG. 3, according to another aspect of the present application, a color correction system having an external flash 10 is further proposed, including an external flash 10, a color correction detection device 20, a terminal device 30, and the color correction processing apparatus 40.

The color correction detection device 20 is used for detecting the light-emission information of the external flash 10 and sending the light-emission information to the terminal device 30. The terminal device 30 processes the light-emission information to obtain digital quantity data of light-emission information and sends the digital quantity data of the light-emission information to the color correction processing apparatus 40. The color correction processing apparatus 40 generates color correction result information according to the digital quantity data of the light-emission information and sends the color correction result information to the external flash 10, and the external flash corrects light emission according to the color correction result information.

Here, the color correction detection device 20 and the terminal device 30 may be connected in a wired or wireless manner.

In an embodiment, the terminal device 30 includes a data sorting circuit, and the data sorting circuit is used for receiving the digital quantity data of the light-emission information at the light-emission information and sorting the digital quantity data of the light-emission information, to generate a sorting data of light-emission information; and the data sorting circuit communicates with a first communication circuit 41 of the color correction processing apparatus 40, so as to transmit the sorting data of the light-emission information to a color correction processing circuit 42 of the color correction processing apparatus 40. That is, in this embodiment, the data sorting circuit is provided in the terminal device 30, which is conducive to the miniaturization and portability of the color correction processing apparatus 40.

In an embodiment, the terminal device 30 includes a display panel, and the display panel is used for displaying an interface for inputting a color correction control instruction. Specifically, the color correction application software is installed in the terminal device 30, and when the color correction application software is running, a color correction control interface may be displayed on the display panel. The color correction control interface includes multiple controls for the user to send a color correction start instruction, set a color correction parameter, select a color correction mode, etc. (hereinafter referred to as color correction control instructions). The color correction control interface may further include a display window to display the color correction progress. This embodiment improves the human-computer interaction ability, and makes it convenient for the user to correct different parameters (brightness, chroma, saturation, etc.) of the external flash 10 according to the user's needs, and correct these parameters to target parameters that meet the user's requirements. The color correction processing circuit 42 performs logic operations based on the sampled light-emission information according to the color correction control instruction, thereby generating the color correction result information.

Figure 8:
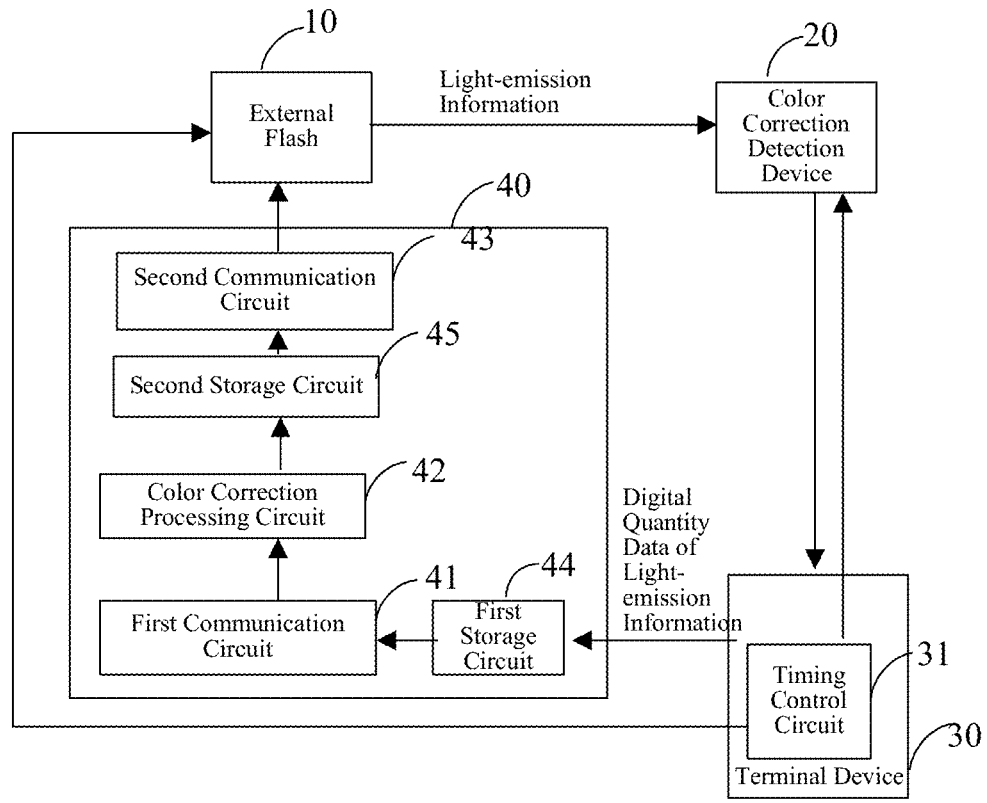
FIG. 8 shows a circuit block diagram of a color correction system having an external flash according to another example embodiment.

Referring to FIG. 8, in an embodiment, the terminal device 30 further includes a timing control circuit 31, and the timing control circuit 31 is electrically connected to the external flash 10, so as to drive the external flash 10 to emit light at a preset timing The timing control circuit 31 is further electrically connected to the color correction detection device 20, so that when the light-emission circuit emits light at the preset timing, the timing control circuit 31 controls the color correction detection device 20 to detect light-emission information of the external flash 10 at the preset timing. A timing control signal of the timing control circuit 31 may be generated according to the color correction control instruction received on the electronic device.

Here, the timing control circuit 31 may send a corresponding timing control signal according to the color correction control instruction. The timing control circuit 31 may transmit timing instructions including illumination mode execution sequence, illumination frequency, brightness-changing timing, color-changing timing, and the like of the external flash 10. The arrangement of the timing control circuit 31 makes the collecting timing and the light-emission timing synchronous, so that the timing information corresponding to the collected light-emission information can be determined, and the accuracy of correction can be improved. In addition, this embodiment allows the correction detection circuit not to collect data when the external flash 10 does not emit light, which is conducive to reducing noise interference of the color control detection circuit 20 and improving the accuracy of data sorting; and it is also conducive to energy conservation.

While the present application has been described with reference to several exemplary embodiments, it should be understood that the terms used herein are illustrative and exemplary and are not limiting. Since the present application can be embodied in various forms without departing from the spirit or essence of the invention, it should therefore be understood that the foregoing embodiments are not limited to any of the foregoing details, but should be construed broadly within the spirit and scope of the appended claims, so that all variations and modifications falling within the scope of the claims or their equivalents are to be covered by the appended claims.

What is claimed is:

1. A color correction processing apparatus, comprising:
   a first communication circuit configured to receive digital quantity data of light-emission information of an external flash;
   a color correction processing circuit electrically connected to the first communication circuit, so as to receive the digital quantity data of the light-emission information by means of the first communication circuit, and to carry out color correction processing according to the digital quantity data of the light-emission information to generate color correction result information;
   a second communication circuit configured to be electrically connected to the external flash, the second communication circuit being electrically connected to the color correction processing circuit to transmit the color correction result information to the external flash, so as to correct light emission of the external flash; and
   a display screen configured to display a color correction control interface for inputting a color correction control instruction.

2. The color correction processing apparatus according to claim 1, wherein the first communication circuit is configured to communicate with a color correction detection device, and the color correction detection device is configured to detect the light-emission information of the external flash and convert the light-emission information to a digital quantity.

3. The color correction processing apparatus according to claim 1, wherein the first communication circuit is configured to communicate with a terminal device, so as to obtain the digital quantity data of the light-emission information from the terminal device; and
   wherein the terminal device is electrically connected to a color correction detection device, so as to obtain the light-emission information.

4. The color correction processing apparatus according to claim 1, wherein the first communication circuit comprises a wireless communication circuit, so as to receive the digital quantity data of the light-emission information through wireless transmission.

5. The color correction processing apparatus according to claim 1, wherein the second communication circuit comprises a wireless communication circuit, so as to send the color correction result information through wireless transmission.

6. The color correction processing apparatus according to claim 1, wherein the color correction processing apparatus further comprises a first storage circuit, and the first storage circuit is electrically connected to the first communication circuit, so as to store the digital quantity data of the light-emission information.

7. The color correction processing apparatus according to claim 6, wherein the color correction processing apparatus further comprises a second storage circuit, and the second storage circuit is electrically connected to the color correction processing circuit, so as to store the color correction result information.

8. The color correction processing apparatus according to claim 1, wherein the color correction processing apparatus further comprises a programming circuit, and the programming circuit is electrically connected to the color correction processing circuit, so as to program the color correction result information output by the color correction processing circuit on a control chip of the external flash.

9. The color correction processing apparatus according to claim 1, wherein the color correction processing circuit further comprises a charging circuit; and
wherein an input of the charging circuit is configured to be connected to power, and an output of the charging circuit is configured to be electrically connected to the external flash.

10. The color correction processing apparatus according to claim 8, wherein the color correction processing apparatus comprises a human-computer interaction assembly;
wherein the human-computer interaction assembly is electrically connected to the color correction processing circuit, and the human-computer interaction assembly is used for one or more of receiving a color correction instruction, receiving a color correction setting parameter, and switching color correction modes.

11. The color correction processing apparatus according to claim 10, wherein the human-computer interaction assembly comprises one or more of a key reception assembly, a voice input assembly, a touch input assembly, and a gesture control assembly.

12. The color correction processing apparatus according to claim 1, wherein a displayed content of the color correction control interface comprises one or more of color correction start-stop information, color correction parameter setting information, and color correction mode switching information.

13. The color correction processing apparatus according to claim 1, wherein the color correction processing apparatus is a handheld device.

14. The color correction processing apparatus according to claim 3, wherein the first communication circuit comprises a first communication interface, and the first communication interface is electrically connected to the color correction processing circuit and provides electrical connection to the color correction detection device or the terminal device.

15. The color correction processing apparatus according to claim 5, wherein the second communication circuit comprises a second communication interface, and the second communication interface is electrically connected to the color correction processing circuit and provides electrical connection to the external flash.

16. A color correction system, comprising an external flash, a color correction detection device, a terminal device, and a color correction processing apparatus;
wherein the color correction processing apparatus comprises:
a first communication circuit configured to receive digital quantity data of light-emission information of the external flash;
a color correction processing circuit electrically connected to the first communication circuit, so as to receive the digital quantity data of the light-emission information by means of the first communication circuit, and to carry out color correction processing according to the digital quantity data of the light-emission information to generate color correction result information;
a second communication circuit configured to be electrically connected to the external flash, the second communication circuit being electrically connected to the color correction processing circuit to transmit the color correction result information to the external flash, so as to correct light emission of the external flash; and
a display screen configured to display a color correction control interface for inputting a color correction control instruction;
wherein the color correction detection device is configured to detect the light-emission information of the external flash and send the light-emission information to the terminal device, wherein the terminal device processes the light-emission information to obtain the digital quantity data of light-emission information and sends the digital quantity data of the light-emission information to the color correction processing apparatus, and wherein the color correction processing apparatus generates the color correction result information according to the digital quantity data of the light-emission information and sends the color correction result information to the external flash, and the external flash corrects light emission according to the color correction result information.

17. The color correction system according to claim 16, wherein the terminal device comprises a data sorting circuit, and the data sorting circuit is configured to receive the digital quantity data of the light-emission information at the light-emission information and sort the digital quantity data of the light-emission information, to generate a sorting data of the light-emission information; and
wherein the data sorting circuit communicates with the first communication circuit of the color correction processing apparatus, so as to transmit the sorting data of the light-emission information to the color correction processing circuit of the color correction processing apparatus.

18. The color correction system according to claim 16, wherein the terminal device further comprises a timing control circuit, and the timing control circuit is electrically connected to the external flash, so as to drive the external flash to emit light at a preset timing; and
wherein the timing control circuit is further electrically connected to the color correction detection device, so that when the external flash emits light at the preset timing, the timing control circuit controls the color correction detection device to detect the light-emission information of the external flash at the preset timing.

19. The color correction system according to claim 16, wherein the color correction processing apparatus further comprises a programming circuit, and the programming circuit is electrically connected to the color correction processing circuit, so as to program the color correction result information output by the color correction processing circuit on a control chip of the external flash.

* * * * *